(12) United States Patent
Kim et al.

(10) Patent No.: US 9,712,040 B1
(45) Date of Patent: Jul. 18, 2017

(54) VIRTUAL IMPEDANCE SHAPING

(71) Applicant: Google Inc., Mountain View, CA (US)

(72) Inventors: Sangsun Kim, San Jose, CA (US); Srinivasa Murthy Salapaka, Champaign, IL (US); Murti V. Salapaka, Plymouth, MN (US); Subhrajit Roychowdhury, San Jose, CA (US)

(73) Assignee: Google Inc., Mountain View, CA (US)

( * ) Notice: Subject to any disclaimer, the term of this patent is extended or adjusted under 35 U.S.C. 154(b) by 430 days.

(21) Appl. No.: 14/586,059

(22) Filed: Dec. 30, 2014

(51) Int. Cl.
*H02J 3/46* (2006.01)
*H02M 1/12* (2006.01)
*H02M 7/44* (2006.01)

(52) U.S. Cl.
CPC ............... *H02M 1/12* (2013.01); *H02M 7/44* (2013.01)

(58) Field of Classification Search
CPC .................................. H02M 1/12; H02M 7/44
USPC ............................................................ 307/24
See application file for complete search history.

(56) References Cited

U.S. PATENT DOCUMENTS

| | | | | | |
|---|---|---|---|---|---|
| 5,212,630 | A | * | 5/1993 | Yamamoto | H02M 7/493 363/65 |
| 5,717,585 | A | * | 2/1998 | Nguyen | H02M 7/53803 363/132 |
| 6,647,114 | B1 | * | 11/2003 | Sacca | H04M 1/76 379/394 |
| 9,479,044 | B1 | * | 10/2016 | Ramesh et al. | G08C 19/00 |
| 2015/0078463 | A1 | * | 3/2015 | Fornage et al. | H04B 3/54 375/257 |

FOREIGN PATENT DOCUMENTS

| | | |
|---|---|---|
| CN | 102842921 | 12/2012 |
| CN | 202931221 | 5/2013 |

OTHER PUBLICATIONS

He and Li, "Analysis, design, and implementation of virtual impedance for power electronics interfaced distributed generation," Industry Applications, IEEE Transactions on, 47(6): 2525-2538, Sep. 2011.

(Continued)

*Primary Examiner* — Ryan Jager
(74) *Attorney, Agent, or Firm* — Fish & Richardson P.C.

(57) ABSTRACT

Methods, systems, and apparatus, including computer programs encoded on a computer storage medium, for shaping grid currents output from parallel inverters in a power distribution system with virtual impedances. In one aspect, a method includes receiving a measurement of the current output from the inverter, processing the measurement of the current to extract a first current component having a particular frequency, obtaining a second current component based on the measurement of the current and the extracted first current component, weighing the first and second current components with respective first and second impedances to obtain respective first and second component voltages, the first impedance having a lower impedance amplitude than the second impedance, obtaining a shaped voltage based on the first and second component voltages, and outputting a control signal to the inverter, the control signal causing the inverter to output the shaped voltage to the power distribution bus.

20 Claims, 7 Drawing Sheets

(56) References Cited

OTHER PUBLICATIONS

He et al., "An Islanding Microgrid Power Sharing Approach Using Enhanced Virtual Impedance Control Scheme," IEEE Transactions on Power Electronics, 28(11):5272-5282, Nov. 2013.
He et al., "Microgrid reactive and harmonic power sharing using enhanced virtual impedance," Applied Power Electronics Conference and Exposition (APEC), 2013 Twenty-Eighth Annual IEEE, pp. 447-452, 2013.
Kim, "Harmonic reference current generation for unbalanced non-linear loads," Power Electronics Specialist Conference, 2003. PESC '03. 2003 IEEE 34th Annual, vol. 2, pp. 773-778, Jun. 2003.

* cited by examiner

VIRTUAL IMPEDANCE SHAPING

BACKGROUND

This specification relates to power inverters.

When paralleling inverters in a resistive grid, e.g., a residential power distribution system, a circulating current flows between the inverters, which may jeopardize the stability of the grid. Physical resistors can be placed at the output terminals of the inverters to limit the circulating current. However, due to power loss at the interconnect resistors, the efficiency of the grid is reduced.

SUMMARY

This specification describes methods, systems and apparatus for shaping grid currents output from parallel inverters in a power distribution system. A controller is configured to shape a grid current output from an inverter with virtual impedance in frequency domain. The controller extracts current components from the grid current and weighs the current components with respective virtual impedances, which can be used to limit or eliminate circulating current to enhance the performance of the power distribution system.

In general, one innovative aspect of the subject matter described in this specification can be embodied in methods for shaping a current output from an inverter coupled to a power distribution bus in a power distribution system. The methods include the actions of receiving a measurement of the current output from the inverter; processing the measurement of the current to extract a first current component having a particular frequency; obtaining a second current component based on the measurement of the current and the extracted first current component; weighing the first and second current components with respective first and second impedances to obtain respective first and second component voltages, the first impedance having a lower impedance amplitude than the second impedance; obtaining a shaped voltage based on the first and second component voltages; and outputting a control signal to the inverter, the control signal causing the inverter to output the shaped voltage to the power distribution bus.

The foregoing and other embodiments can each optionally include one or more of the following features, alone or in combination. For example, shaping a current can include obtaining a first modulation signal having the particular frequency, and processing the measurement of the current to extract a first current component can include extracting the first current component based on the measurement of the current and the first modulation signal. In some examples, shaping a current can further comprise obtaining a second modulation signal having the particular frequency, and processing the measurement of the current to extract a first current component can include extracting the first current component based on the measurement of the current and the first and second modulation signals. The first modulation signal can be a sine wave signal having the particular frequency and the second modulation signal can be a cosine wave having the particular frequency. Obtaining a second current component can include subtracting the first current component from the measurement of the current. In some implementations, shaping a current can include shaping the current by a linear filter.

The method can include determining the particular frequency to be one of a fundamental frequency of the power distribution system or a harmonic frequency of the fundamental frequency of the power distribution system, and shaping a current can further include processing the measurement of the current to extract a third current component having a harmonic frequency of the fundamental frequency, the harmonic frequency being different from the particular frequency, wherein obtaining a second current component comprises subtracting the first and third current components from the measurement of the current; weighing the third current component with a third impedance to obtain a third component voltage, the third impedance having a smaller impedance amplitude than the second impedance; and obtaining the shaped voltage based on the first, second and third component voltages.

In some cases, the method further includes receiving a voltage measurement of a load coupled to the power distribution bus; and determining the particular frequency based on the voltage measurement of the load. The method can include determining the respective first and second impedances for the first and second current components. Determining the respective first and second impedances for the first and second current components can include adjusting the first and second impedances for the first and second current components based on one or more performance parameters of the power distribution system.

In some examples, the method further includes shaping a second current output from a second inverter coupled to the power distribution bus in the power distribution system, the second inverter outputting a second shaped voltage to the power distribution bus. The method can also include determining the respective first and second impedances for the first and second current components based on the second shaped voltage output from the second inverter.

In another general embodiment, a system includes a plurality of distributed generation units and a power distribution bus coupled to the plurality of distributed generation units. Each of the plurality of distributed generation units includes a respective DC power source; a respective inverter coupled to the respective DC power source; and a respective local controller coupled to the respective inverter and configured to perform operations comprising: receiving a measurement of a current output from the respective inverter; processing the measurement of the current to extract a first current component having a particular frequency; obtaining a second current component based on the measurement of the current and the extracted first current component; weighing the first and second current components with respective first and second impedances to obtain respective first and second component voltages, the first impedance having a lower impedance amplitude than the second impedance; obtaining a shaped voltage based on the first and second component voltages; and outputting a control signal to the respective inverter, the control signal causing the respective inverter to output the shaped voltage to the power distribution bus that is configured to transfer the shaped voltages from the distributed generation units to one or more loads coupled to the power distribution bus.

The foregoing and other embodiments can each optionally include one or more of the following features, alone or in combination. For example, the particular frequency can be a fundamental frequency of the power distribution system, and the operations can further comprise: processing the measurement of the current to extract a plurality of current components having respective harmonic frequencies of the fundamental frequency, wherein obtaining a second current component comprises obtaining the second current component by subtracting the plurality of current components and the first current component from the measurement of the current; and weighing the plurality of current components with respective impedances to obtain respective component voltages, the respective impedances having impedance amplitudes smaller than the second impedance, wherein obtaining a shaped voltage comprises obtaining the shaped voltage based on the respective component voltages and the first and second component voltages.

In some examples, the operations further include determining the respective first and second impedances for the first and second current components. Determining the respective first and second impedances for the first and second current components can include adjusting the first and second impedances for the first and second current components based on one or more performance parameters of the system. In some examples, the operations further comprise determining the respective first and second impedances for the first and second current components based on shaped voltages output from the other inverters of the plurality of distributed generation units in the power distribution system.

The system can further include a main controller configured to communicate with the respective local controllers for the distributed generation units. In some examples, the one or more loads include a nonlinear load, and the main controller can be configured to: receive a voltage measurement of the nonlinear load; process the received voltage measurement to determine one or more voltage components having one or more respective harmonic frequencies of a fundamental frequency of the power distribution system; and transmit information of the determined voltage components to the local controllers. For each of the local converters, determining a particular frequency of the power distribution system can include: receiving the transmitted information of the determined voltage components from the main controller; and determining the particular frequency to be the harmonic frequency of a voltage component having the largest voltage amplitude among the determined voltage components.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. First, a controller for an inverter in a power distribution system can shape a grid current output from the inverter with virtual impedance in frequency domain to limit or eliminate circulating current in the system, which can improve the system performance such as stability and total harmonic distortion (THD). Second, the virtual impedances can be emulated in the controller, e.g., a microcontroller, which is simple, efficient, cost-effective and without power loss. Third, the controller can be integrated in the inverter or included in a main controller of the system, which improves simplicity and robustness of the system. Fourth, the shaped voltage output from the inverter has no or little phase lag at a fundamental frequency of the system, which improves voltage sharing, efficiency and robustness of the system. Fifth, the controller can shape the grid current in high frequency harmonic frequencies, which enables the system work for highly nonlinear loads with high power ratings, e.g., air conditioners. Sixth, the controller can selectively determine the fundamental virtual impedance with a small value, which can tightly maintain the AC output voltage at the fundamental frequency, e.g., 120 V AC±5%. Seventh, the controller enables a good transient response. For example, when the load current is step changed, all the inverters on the grid can share the transient current equally at higher frequency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
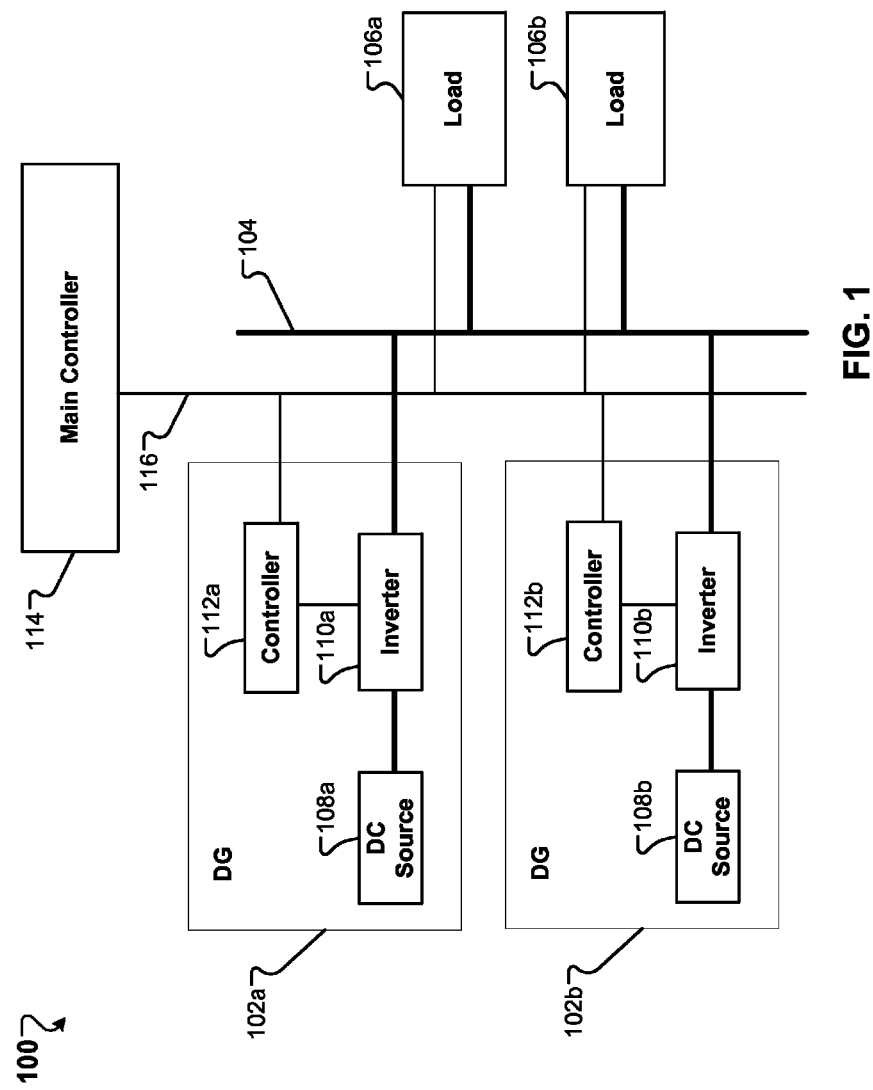
FIG. 1 is a block diagram of an example power distribution system including controllers for parallel inverters.

FIG. 1 is a block diagram of an example power distribution system 100. The power distribution system 100 can be an electrical grid, e.g., a resistive grid, a microgrid, a residential power distribution system, or an industrial power distribution system. The power distribution system 100 can include a number of parallel distributed generation (DG) units, e.g., 102a and 102b, coupled to a power distribution bus 104 of the power distribution system 100. Each DG unit 102a or 102b can provide electric power through the power distribution bus 104 to one or more loads 106 coupled to the power distribution bus 104.

A DG unit 102 can be an alternating current (AC) power generation unit for providing AC power. The AC power generation unit can be a single-phase unit or a triple-phase unit. The DG unit 102a or 102b includes a direct current (DC) power source 108a or 108b and an inverter 110a or 110b. The DC power source 108a or 108b can include batteries, fuel cells, renewable energy resources such as solar power or wind power, or any suitable power sources.

An output voltage from the DC power source 108a or 108b can include 12 V DC, 24 V DC, 48 V DC, 200 to 400 V DC, 300 to 450 V DC, or any suitable voltage.

The inverter 110a or 110b receives DC power from the DC power source 108a or 108b and converts the DC power to AC power. The inverter 110a or 110b outputs the AC power to the power distribution bus 104. The output AC power can be used to operate AC equipment such as computers or rectified to produce DC power at any desired voltage.

The output AC power can be an AC current, an AC voltage, or both. In some examples, the output AC power has an output voltage of about 120 VAC or 240 VAC and a voltage/current waveform of a square wave, a sine wave, or a modified sine wave. The output AC power can have an AC output frequency corresponding to a fundamental frequency of the power distribution system 100, e.g., 60 Hz. The output AC current from the inverter 110a or 110b to the power distribution bus 104 can be also labeled as a grid current from the inverter 110a or 110b.

Inverters 110a and 110b of the DG units 102a and 102b output AC power to the power distribution bus 104 in parallel. During parallel operation, inconsistency of parameters in each DG unit 102a or 102b can cause a circulating current in the power distribution system 100. The circulation current can be eliminated, for example, by eliminating differences between outputs of the parallel inverters 110a and 110b. In some cases, a mismatch in higher frequency components in the outputs (e.g., the output currents and/or voltages) destabilizes the circulating current. The outputs can be regulated at a fundamental frequency of the power distribution system 100, e.g., 60 Hz.

In some implementations, a filter is coupled to the inverter 110a or 110b. The filter can be configured to cause the inverter 110a or 110b to adjust an output current of the inverter 110a or 110b, such that the output current is adjusted based on weighting of different impedances at different frequencies. The output current can be weighed with a lower impedance at the fundamental frequency to address the voltage regulation and higher impedances at high frequencies to limit high frequency circulating current to enhance stability. The filter can include a linear filter, e.g., a high pass filter with a cut-off frequency above the fundamental frequency, or a notch filter with a notch frequency at the fundamental frequency. The filter can be implemented as an analog filter or a digital filter or any suitable combination of analog filters and digital filters.

In some implementations, each DG unit, e.g., 102a or 102b includes a local controller, e.g., 112a or 112b, for the inverter, e.g., 110a or 110b. The local controller 112a or 112b can be integrated in the inverter 110a or 110b or separated as an independent unit in the DG unit 102a or 102b. The local controller 112a or 112b can be configured to shape the output current and/or voltage from the inverter 110a or 110b, e.g., in the frequency domain. The local controllers 112a and 112b for the parallel inverters 110a and 110b can be configured together to control the outputs of the parallel inverters 110a and 110b to eliminate the circulation current in the power distribution system 100.

In some implementations, the power distribution system 100 includes a main controller 114 in communication with the local controllers 112a and 112b via a communication bus 116. Each local controller 112a or 112b can communicate with each other via the communication bus 116. The power distribution system 100 can include measurement units for monitoring and/or measuring parameters such as output currents or voltages of the inverters 110a and 110b and/or the currents, impedances or voltages of the loads 106a and 106b. The main controller 114 can collect measurement results from the measurement units, generate control signals based on the measurement results, and transmit the control signals to the local controllers 112a and 112b to control the outputs of the parallel inverters 110a and 110b.

In some implementations, the main controller 114 is in direct communication with the parallel inverters 110a and 110b. The main controller 114 can collect information (e.g., current, impedance, and/or voltage measurements) about the inverters 110a and 110b and/or the loads 106a and 106b and directly transmit control signals to individual inverter 110a or 110b to control the individual outputs of the inverter 110a or 110b based on the collected information. The main controller 114 can be configured to control an individual inverter 110a or 110b, substantially similar to the respective local controller 112a or 112b for the inverter 110a or 110b.

As noted above, the local controller 112a or 112b can shape the grid current (e.g., the output AC current) output from the inverter 110a or 110b. A measurement unit can be used to measure the grid current. The local controller 112a or 112b can receive the measurement result of the grid current directly from the measurement unit or from the main controller 114 that is in communication with the measurement unit.

The local controller 112a or 112b can determine a particular frequency of the power distribution system 100. For example, the power distribution system 100 can have a fundamental frequency (e.g., 60 Hz). The local controller 112a or 112b can select the fundamental frequency or a harmonic frequency of the fundamental frequency as the particular frequency.

In some cases, one or more of the loads, e.g., 106a or 106b is a nonlinear load, e.g., a rectifier or an air conditioner. A voltage measurement of the nonlinear load 106a or 106b includes harmonic components having one or more harmonic frequencies of the fundamental frequency. The main controller 114 can process the voltage measurement of the nonlinear load to determine information about the harmonic components and the harmonic frequencies and transmit the information to the local controller 112a or 112b. In some examples, the local controller 112a or 112b can select the harmonic frequency of a voltage component having the largest voltage amplitude among the determined voltage components to be the particular frequency. In some examples, the local controller 112a or 112b can select all the harmonic frequencies and determine the particular frequency to be each of the harmonic frequencies for a respective extracting filter, as discussed in further details below.

Figure 2A:
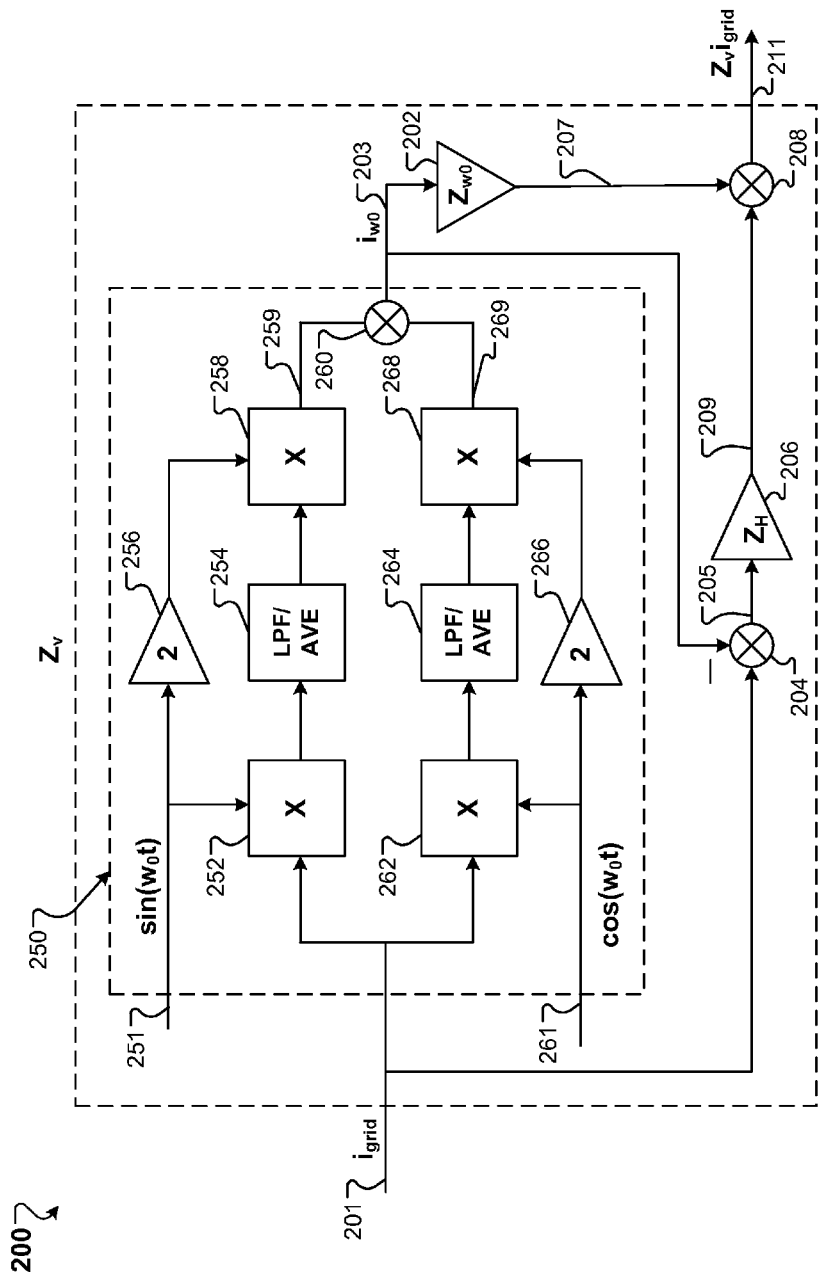
FIG. 2A is a block diagram showing an example realization of shaping a grid current output from an inverter with virtual impedance.
Figure 2B:
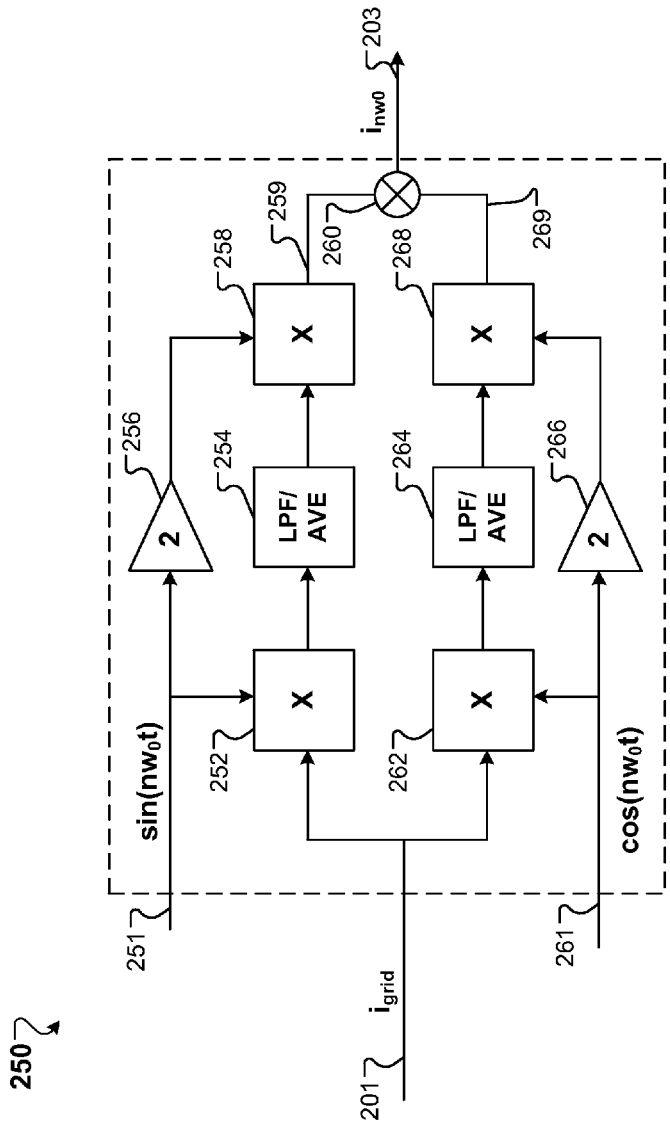
FIG. 2B is a block diagram showing extraction of harmonic components from the grid current.

In some implementations, the local controller 112a or 112b processes the measurement of the grid current to extract a first current component, e.g., a primary current component, having the particular frequency, as discussed in further details in FIGS. 2A and 2B. Based on the first current component and the measurement of the grid current, the local controller 112a or 112b obtains a second current component (or the remaining current component of the grid current), e.g., by subtracting the first current component from the measurement of the grid current.

The local controller 112a or 112b can weigh different current components of the grid current with respective impedances to obtain respective component voltages. For example, an impedance for the first current component having the particular frequency can have a lower impedance amplitude than an impedance for the second current component. The first and second current components can be multiplied by the respective impedances to generate the first and second component voltages.

The local controller 112a or 112b obtains a shaped voltage based on the first and second component voltages, e.g., by summing the first and second component voltages. The local controller 112a or 112b then outputs a control signal to the inverter 110a or 110b. The control signal can cause the inverter 110a or 110b to output the shaped voltage to the power distribution bus 104. For example, the inverter 110a or 110b can include an internal controller for receiving the control signal from the local controller 112a or 112b and outputting the shaped voltage.

In some implementations, the local controller 112a or 112b processes, e.g., using Fourier analysis, the measurement of the grid current to extract a number of current components having respective harmonic frequencies of the fundamental frequency, as discussed further below with reference to FIG. 3. The remaining current component can be obtained by subtracting the number of current components from the measurement of the grid current.

The local controller 112a or 112b or the main controller 114 can determine, for an individual inverter 110a or 110b, respective impedances for different current components of the grid current of the individual inverter 110a or 110b, based on properties of the parallel inverters 110a and 110b and/or the loads 106a and 106b. For example, the impedances for different current components of the grid current of a first inverter, e.g., 110a, can be determined based on the output voltages of the other inverters, e.g., 110b, in the power distribution system 100.

In some implementations, the local controller 112a or 112b or the main controller 114 determines or adjusts the impedances for the current components based on one or more performance parameters of the power distribution system 100. The local controller 112a or 112b or the main controller 114 can first determine initial values for the impedances and then adjust the values for the impedances based on the performance parameters. The performance parameters can include stability, voltage regulation, total harmonic distortion (THD), efficiency, power sharing, or a measurement of the shaped voltage output from the inverter 100, as illustrated in further details in FIGS. 4A-5B.

FIG. 2A shows an example shaping filter 200 of shaping a grid current from an inverter with virtual impedance. FIG. 2B shows an example extracting filter 250 for extracting a current component from the grid current. The extracting filter 250 can be used by the shaping filter 200. The inverter can be similar to the inverter 110a or 110b of FIG. 1. The inverter can receive a DC power from a DC power source (e.g., the DC power source 108a or 108b of FIG. 1) and output an AC power to a power distribution bus (e.g., the power distribution bus 104 of FIG. 1) in a power distribution system (e.g., the power distribution system 100 of FIG. 1). The shaping filter 200 and/or the extracting filter 250 can be implemented in a controller for the inverter, e.g., the local inverter 112a or 112b or/and the main inverter 114 of FIG. 1. The shaping filter 200 and/or the extracting filter 250 can be implemented in a digital circuit, an analog circuit, or any suitable combination.

The shaping filter 200 receives a measurement of a grid current $i_{grid}$ 201 output from the inverter. The shaping filter 200 can receive the measurement from a measurement unit or a main controller, e.g., the main controller 114 of FIG. 1. The shaping filter 200 then processes the measurement of the grid current 201 to obtain current components 203 and 205 of the grid current 201.

The controller can determine a particular frequency for the shaping filter 200. As noted above, the controller can determine the particular frequency to be a fundamental frequency $\omega_0$ of the power distribution system or a harmonic frequency $\omega_n$ of the fundamental frequency. $\omega_n$ is an integral multiple of the fundamental frequency $\omega_0$. In FIG. 2A, for illustration, the particular frequency is determined to be the fundamental frequency $\omega_0$.

The shaping filter 200 can use the extracting filter 250 to extract a current component 203 having the particular frequency from the grid current 201. The extracting filter 250 can receive a modulation signal 251, e.g., a sine wave signal sin $(\omega_0 t)$ having the particular frequency $\omega_0$, and/or a modulation signal 253, e.g., a cosine wave signal cos $(\omega_0 t)$ having the particular frequency $\omega_0$. The controller can generate the modulation signals 251 and 253 based on the determined particular frequency, e.g., by using a clock of the power distribution system, and transmit the modulation signals 251 and 253 to the extracting filter 250.

The extracting filter 250 receives the grid current 201 and the sine wave signal 251, and performs a convolution operation using a multiplication component 252 to obtain a modulated signal 253. That is, the sine wave signal 251 becomes a carrier signal for the grid current 201. The extracting filter 250 then filters the modulated signal 253 using a filter component 254 to obtain a filtered signal 255. The filter component 254 can include at least one of a low pass filter (LPF) or an average operator (AVG). The sine wave signal 251 is amplified by an amplifier 256 with a gain of 2 to be an amplified signal 257. Then the filtered signal 255 and the amplified signal 257 are input into another multiplication component 258 that performs a convolution operation to obtain a second modulated signal 259.

Similarly, the extracting filter 250 receives the grid current 201 and the cosine wave signal 261 and performs a convolution operation using a multiplication component 262 to obtain a modulated signal 263. That is, the cosine wave signal 261 becomes a carrier signal for the grid current 201. The extracting filter 250 then filters the modulated signal 263 using a filter component 264 to obtain a filtered signal 265. The filter component 264 can include at least one of a low pass filter (LPF) or an average operator (AVG). The cosine wave signal 261 is amplified by an amplifier 266 with a gain of 2 to be an amplified signal 267. Then the filtered signal 265 and the amplified signal 267 are input into another multiplication component 268 that performs a convolution operation to obtain a second modulated signal 269.

The extracting filter 250 sums up the second modulated signals 259 and 269 using a summation operator 260 to output the extracted current component $i_{w0}$ 203, that is, the fundamental component of the grid current $i_{grid}$ 201. The extracting filter 250 can extract the current component $i_{w0}$ 203 in real time. In some examples, $i_{w0}$ is expressed as $i_0 \sin(\omega_0 t + \theta_0)$, where $i_0$ is a current constant and $\theta_0$ is a phase constant. The shaping filter 200 subtracts the extracted current component $i_{w0}$ from the grid current $i_{grid}$ using an subtraction operator 204 to obtain a remaining current component $i_H$ 205, that is, $i_H = i_{grid} - i_{w0}$.

The controller can weigh the two current components 203 and 205 with respective impedances. As discussed above, the controller and/or the main controller can determine the respective impedances based on properties of one or more parallel inverters and/or loads in the power distribution system and/or one or more performance parameters to achieve desired stability and performance. In some examples, the impedance for the fundamental current component 203 is determined to have a smaller impedance amplitude than the impedance for the remaining current component 205.

The impedances can be implemented as virtual impedances, e.g., using amplifiers. The amplifiers are components of the shaping filter 200 and can be implemented in physical amplifiers or digital amplifiers or suitable combinations. As illustrated in FIG. 2A, the fundamental current component 203 is input into an amplifier 202 with a virtual impedance $Z_{w0}$ to obtain a component voltage $V_{w0}$ 207, that is, $V_{w0}=Z_{w0} i_{w0}$. The remaining current component 205 is input into another amplifier 206 with a virtual impedance Zx to obtain a component voltage $V_H$ 209, that is, $V_H=Z_H i_H=Z_H (i_{grid}-i_{w0})$.

The shaping filter 200 then sums the component voltages $V_{w0}$ 207 and $V_H$ 209 using a summation operator 208 to obtain a shaped voltage $V_{out}$ 211, that is, $V_{out}=V_{w0}+V_H=Z_{w0} i_{w0}+Z_H (i_{grid}-i_{w0})$. Thus, the shaping filter 200 shapes the grid current $i_{grid}$ of the inverter by multiplying the grid current $i_{grid}$ with a virtual impedance $Z_v$ that satisfies the following equation:

$$V_{out}=Z_v i_{grid}=Z_{w0} i_{w0}+Z_H(i_{grid}-w_0).$$

FIG. 2B shows a generalized extracting filter 250 that can be configured to extract any current component with any suitable frequency from a grid current in real time. For example, the extracting filter 250 can extract a harmonic component $i_{n w 0}$ having a harmonic frequency $n\omega_0$ from the grid current $i_{grid}$, where n is the order of the harmonic frequency. The extracting filter 250 receives modulation signals 251 and 261 having the same harmonic frequency $n\omega_0$, e.g., a sine wave signal $\sin(n\omega_0 t)$ for the modulation signal 251 and a cosine wave signal $\cos(n\omega_0 t)$ for the modulation signal 261, and extracts the harmonic component $i_{n w 0}$ based on the input grid current $i_{grid}$ and the modulation signals 251 and 261, as discussed above. The controller can use the extracted harmonic component $i_{n w 0}$ to control the voltage output from the inverter, as discussed in further details in FIG. 3.

Figure 3:
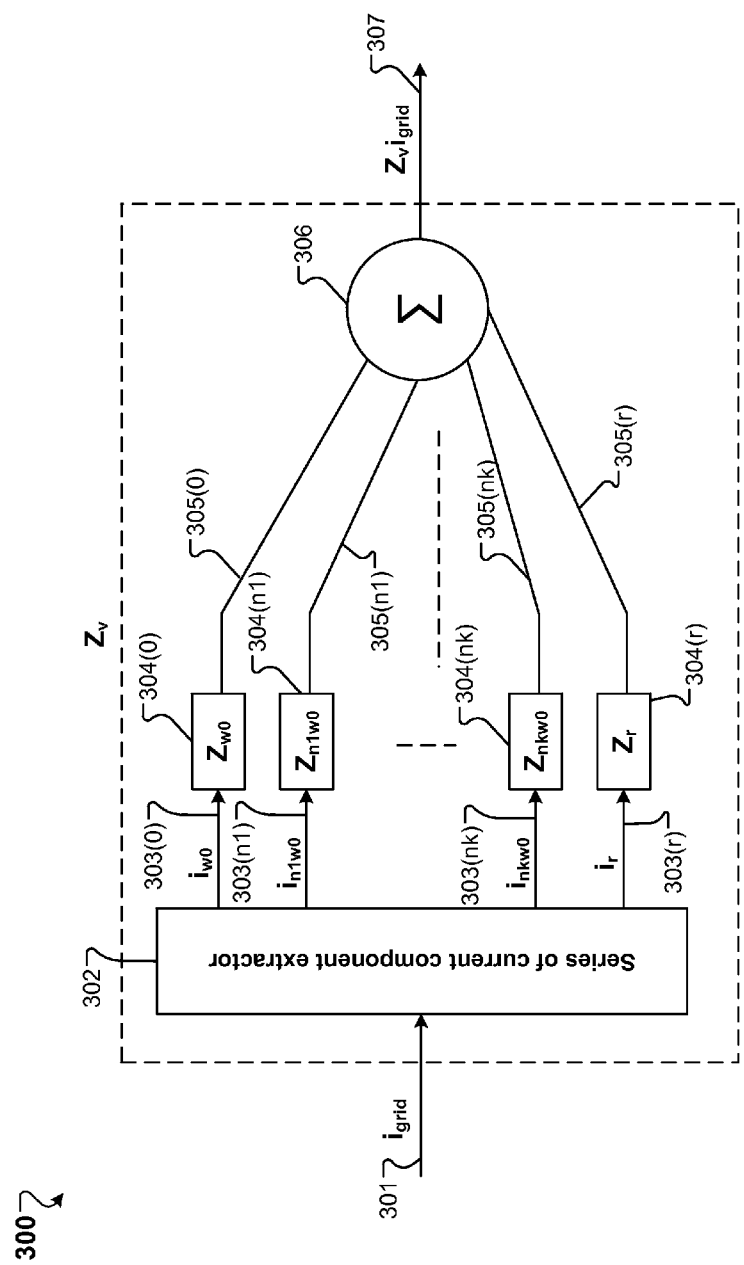
FIG. 3 is a block diagram showing an example realization of using virtual impedances to shape a grid current with total harmonic distortion improvement.
Figure 4:
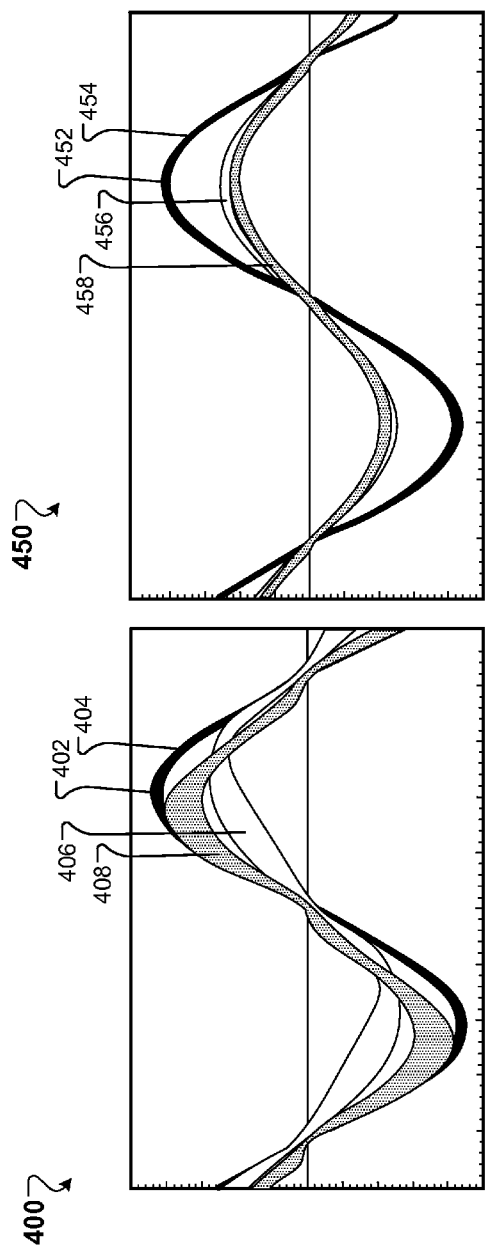
FIG. 4A shows plots representing current and voltage output from two parallel inverters without virtual impedance shaping for a linear load.
FIG. 4B shows plots representing current and voltage output from two parallel inverters with virtual impedance shaping for the linear load.
Figure 5:
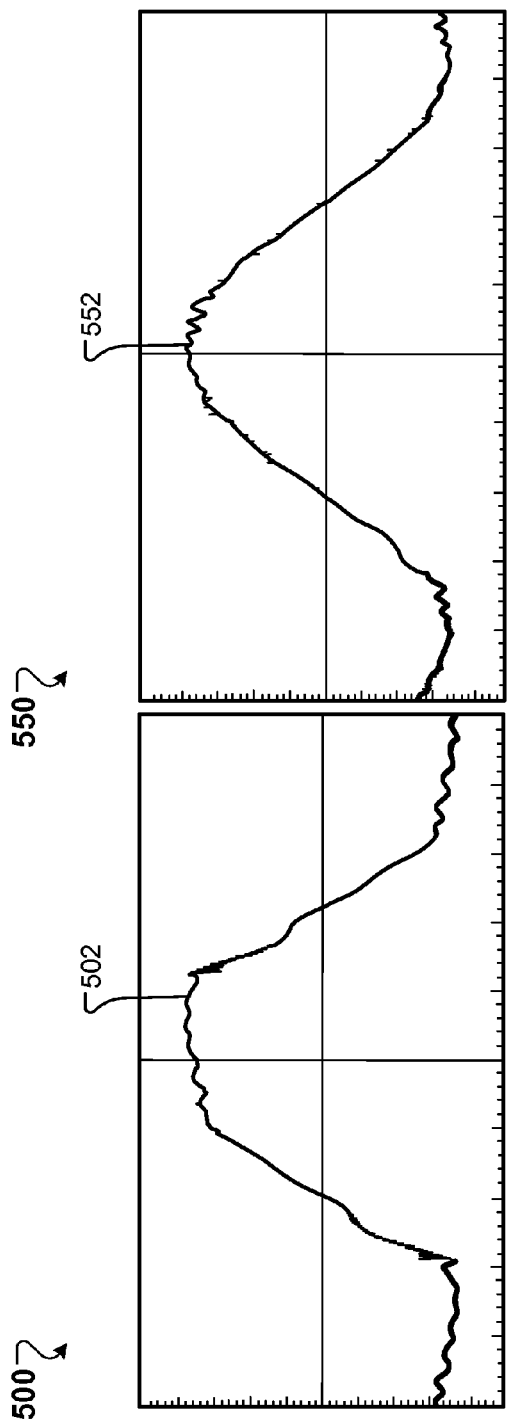
FIG. 5A shows a plot representing a voltage output from a commercial inverter for a nonlinear load.
FIG. 5B shows a plot representing a voltage output from an inverter with virtual impedance shaping for the nonlinear load.

FIG. 3 shows an example shaping filter 300 of shaping a grid current from an inverter with total harmonic distortion (THD) improvement. The inverter can be similar to the inverter 110a or 110b of FIG. 1. The inverter receives a DC power from a DC power source (e.g., the DC power source 108a or 108b of FIG. 1) and outputs an AC power to a power distribution bus (e.g., the power distribution bus 104 of FIG. 1) in a power distribution system (e.g., the power distribution system 100 of FIG. 1). The shaping filter 300 can have properties similar to the shaping filter 200 of FIG. 2A. The shaping filter 300 can be implemented in a controller for the inverter, e.g., the local controller 112a or 112b or/and the main controller 114 of FIG. 1. The shaping filter 300 can be implemented in a digital circuit, an analog circuit, or any suitable combination.

The shaping filter 300 includes a series of current component extracting filters 302. Each extracting filter can be similar to the extracting filter 250 of FIGS. 2A and 2B. The controller can determine a series of frequencies for the shaping filter 300. For example, the frequencies can include a fundamental frequency $\omega_0$, a first harmonic frequency $n_1\omega_0$ ... and a kth harmonic frequency $n_k\omega_0$. For each frequency, the controller can generate respective modulation signals having the frequency, e.g., the modulation signals 251 and 261 of FIGS. 2A and 2B, and transmit the modulation signals to a respective extracting filter 302.

The shaping filter 300 receives a measurement of the grid current $i_{grid}$ 301 and transmits to the extracting filters 302. The extracting filters 302 can extract the respective current components $i_{w0}$ 303(0), $i_{n_1 w 0}$ 303($n_1$) ... $i_{n_k w 0}$ 303($n_k$) from the grid current $i_{grid}$ based on the respective modulation signals. The shaping filter 300 can include a subtraction operator, e.g., the subtraction operator 204 of FIG. 2A, to subtract all the extracted current components $i_{w0}$, $i_{n_1 w 0}$ ... $i_{n_k w 0}$ from the grid current $i_{grid}$ to obtain a remaining current component $i_r$.

The controller weighs different current components $i_{w0}$, $i_{n_1 w 0}$ ... $i_{n_k w 0}$, $i_r$ with respective impedances $Z_{w0}$, $Z_{n_1 w 0}$ ... $Z_{n_k w 0}$, $Z_r$. As discussed above, the controller can determine the respective impedances based on properties of one or more parallel inverters and/or loads in the power distribution system and one or more performance parameters to achieve desired stability and performance.

In some examples, the impedance $Z_{w0}$ for the fundamental current component $i_{w0}$ is determined to have a smaller impedance amplitude than the impedances $Z_{n_1 w 0}$ ... $Z_{n_k w 0}$, $Z_r$ for the others current component $i_{n_1 w 0}$ ... $i_{n_k w 0}$, $i_r$. In some examples, the impedances (e.g., $Z_{w0}$, $Z_{n_1 w 0}$ ... $Z_{n_k w 0}$) for one or more harmonic components (e.g., $i_{w0}$, $i_{n_1 w 0}$ ... $i_{n_k w 0}$) have smaller impedance amplitudes than the impedance $Z_r$ for the remaining current component $i_r$. In a particular example, the impedances for the harmonic components are substantially identical.

As noted above, the impedances $Z_{w0}$, $Z_{n_1 w 0}$ ... $Z_{n_k w 0}$, $Z_r$ can be implemented as virtual impedances, e.g., using amplifiers 304(0), 304($n_1$) ... 304($n_k$), 304(r) with corresponding impedances. The current components 303(0), 303($n_1$) ... 303($n_k$), 303(r) are input into the respective amplifiers to obtain respective component voltages 305(0), 305($n_1$) ... 305($n_k$), 305(r). The shaping filter 300 then sums all the component voltages using a summation operator 306 to obtain a shaped voltage $V_{out}$ 307. Thus, the shaping filter 300 shapes the grid current of the inverter by multiplying the grid current $i_{grid}$ with a virtual impedance $Z_v$ using the THD improvement. The controller can then output a control signal to the inverter that causes the inverter to output the shaped voltage to the power distribution bus of the power distribution system.

In some examples, the number of harmonic components chosen depends on various performance metrics of the power distribution system, e.g., stability, voltage regulation, THD, efficiency, or power sharing. In a particular example, the shaping filter 300 selects up to the $9^{th}$ harmonic component that gives a desired system performance.

FIGS. 4A and 4B show plots representing current and voltage outputs from two parallel inverters (first and second inverters) in a power distribution system without and with virtual impedance shaping for a linear load, respectively. FIGS. 4A and 4B demonstrate the effect of the virtual impedance shaping on stability of a power distribution system.

Plots in FIGS. 4A and 4B are recorded in persistence mode of an oscilloscope, where the width of a trace is an indicator of the current/voltage fluctuation. Accordingly, the current/voltage fluctuation indicates the stability of the power distribution system. Voltage plot 402 and current plot 406 in FIG. 4A show the first voltage and first current output from the first inverter with a constant impedance. Voltage plot 404 and current plot 408 in FIG. 4A show the second voltage and second current output from the second inverter with the same constant impedance. Voltage plots 402 and 404 are almost identical and thus appear to be superimposed, while current plots 406 and 408 are different and separated with a phase lag. Under identical test conditions to achieve the same performance, e.g., voltage regulation, efficiency, THD, and/or power sharing, the currents output from the inverters are shaped with virtual impedance, e.g., by using the shaping filter 200 in FIG. 2A or the shaping filter 300 in FIG. 3.

Voltage plot 452 and current plot 456 in FIG. 4B shows the results of the first voltage and first current output from the first inverter with the virtual impedance shaping. Voltage plot 454 and current plot 458 in FIG. 4B shows the results of the second voltage and second current output from the second inverter with the virtual impedance shaping. Current plots 456 and 458 correspond to the shaped voltages for the first and second currents output from the first and second inverters, respectively. Voltage plots 452 and 454 are almost identical, and current plots 456 and 458 are substantially identical with no or little phase lag.

Current plots 406 and 408 have much larger fluctuations than current plots 456 and 458, which demonstrates that the virtual impedance shaping can improve the stability of the power distribution system. Also current plots 406 and 408 from the first and second inverters have a phase lag between each other, and have phase mismatch with voltage plots 402 and 404. In contrast, currents 456 and 458 have no or substantially small phase lag between each other and also voltages 452 and 454. It is shown that the virtual impedance shaping minimizes or eliminates the phase lags between the first inverter and the second inverter and improves the performance of the power distribution system.

FIGS. 5A and 5B demonstrate the effect of virtual impedance shaping with total harmonic distortion (THD) improvement. Plot 502 in FIG. 5A represents a voltage output from an inverter that supplies power to a rectifier load, that is, a nonlinear load, without the virtual impedance shaping. Plot 552 in FIG. 5B represents a voltage output from an inverter with the virtual impedance shaping, e.g., by using the shaping filter 300 of FIG. 3, in response to the same rectifier load.

Test conditions were maintained to be identical in both cases. The shaped voltage waveform in plot 552 remains almost sinusoidal except for oscillations near the peak, while the voltage waveform in plot 502 is substantially deviated from being a sinusoid. With the virtual impedance shaping, the voltage THD is improved to 4.3% in comparison to 11.9% of the inverter, which demonstrates an improvement in total harmonic distortion with the virtual impedance shaping.

Figure 6:
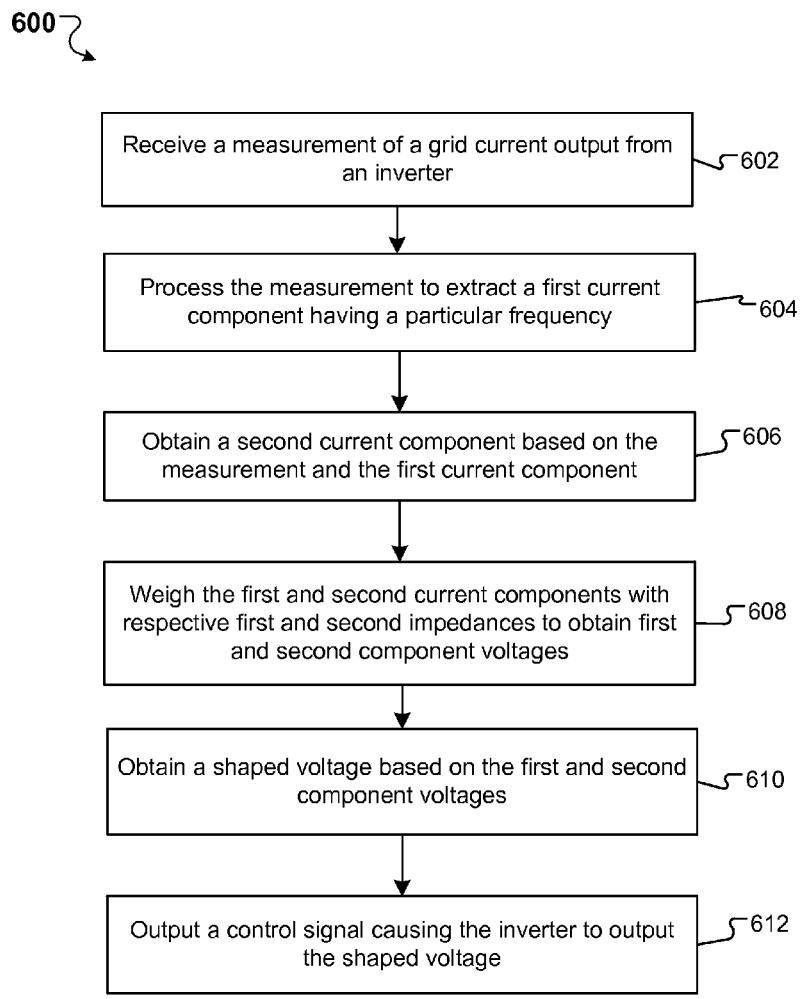
FIG. 6 is a flow chart of an example process performed by a controller for an inverter in a power distribution system.

FIG. 6 is a flow chart of an example process performed by a controller for an inverter in a power distribution system, e.g., a resistive grid. The power distribution system includes a number of parallel inverters coupled to a power distribution bus of the power distribution system. The power distribution system and the inverter can be similar to the power distribution system 100 and the inverter 110a or 110b of FIG. 1, respectively. The controller can be configured to shape a grid current output from the inverter. The controller can be similar to the controller 112a or 112b of FIG. 1, the controller including the shaping filter 200 of FIGS. 2A and 2B, or the controller including the shaping filter 300 of FIGS. 3A and 3B.

The controller receives a measurement of the grid current output from the inverter (602). A measurement unit can be used to measure the grid current output from the inverter and transmit the measurement result of the grid current to the controller. In some examples, the power distribution system includes a main controller in communication with the measurement unit and the controller. The main controller can collect the measurement result and transmit to the controller.

In some implementations, the controller determines a particular frequency to be a fundamental frequency of the power distribution system or a harmonic frequency of the fundamental frequency. In some examples, the controller receives a voltage measurement of a load coupled to the power distribution bus. The voltage measurement can include one or more harmonic components having respective harmonic frequencies. The controller can determine the particular frequency to be one of the harmonic frequencies.

In a particular example, a nonlinear load is coupled to the power distribution bus in the power distribution system. A main controller, e.g., the main controller 114 of FIG. 1 can receive a voltage measurement of the nonlinear load, process the received voltage measurement to determine one or more voltage components having one or more respective harmonic frequencies of the fundamental frequency, and transmit information of the determined voltage components to the controller for the inverter. The controller can receive the transmitted information of the determined voltage components from the main controller; and determine the particular frequency to be one of the harmonic frequencies, e.g., the harmonic frequency of a voltage component having the largest voltage amplitude among the determined voltage components. The controller can also select the particular frequency to be each of the harmonic frequencies for a respective extracting filter to extract a respective harmonic current component having the harmonic frequency.

The controller processes the measurement of the grid current to extract a first current component having the particular frequency (604). The controller can include an extracting filter, e.g., the extracting filter 250 of FIGS. 2A and 2B. The extracting filter can extract the first current component having the particular frequency from the grid current.

In some implementations, the controller obtains a modulation signal having the particular frequency, e.g., the modulation signal 251 of FIGS. 2A and 2B. The extracting filter extracts the first current component based on the measurement of the grid current and the modulation signal. In some examples, the controller obtains a second modulation signal having the particular frequency, e.g., the modulation signal 261 of FIGS. 2A and 2B. The two modulation signals can be a sine wave signal and a cosine wave signal, respectively. The extracting filter extracts the first current component based on the measurement of the grid current and the two modulation signals.

The controller obtains a second current component based on the measurement and the first current component (606). The controller can use a subtraction operator, e.g., the subtraction operator 204 of FIG. 2A, to subtract the first current component from the measurement of the grid current to obtain the second current component. The first current component can be a fundamental current component of the grid current, and the second current component can be the remaining current component of the grid current.

The controller weighs the first and second current components with respective first and second impedances to obtain first and second component voltages (608). The controller can determine respective impedances for different current components based on properties of other inverters and loads in the power distribution system and/or one or more performance parameters of the power distribution system. To eliminate a circulating current, the controller can determine that the first impedance for the first current component has a lower impedance amplitude than the second impedance for the second current component.

In some cases, the controller determines or adjusts the first and second impedances for the first and second current components based on one or more performance parameters of the power distribution system, e.g., stability, voltage regulation, total harmonic distortion (THD), efficiency, power sharing, or a measurement of the shaped voltage output from the inverter. In some cases, the controller determines the first and second impedances for the first and second current components based on one or more voltages output from one or more other inverters in the power distribution system.

In some implementations, the respective impedances for the current components are virtual impedances. The impedances can be implemented by amplifiers having the respective impedances, e.g., the amplifiers 202 and 206 of FIG. 2A. The first and second current components can be input to the respective amplifiers to obtain the first and second component voltages.

The controller obtains a shaped voltage based on the first and second component voltages (610). The controller can sum the first and second component voltages to obtain the shaped voltage, e.g., by using a summation operator 208 of FIG. 2A.

In some implementations, the controller processes the measurement of the current to extract a plurality of harmonic components having respective harmonic frequencies of the fundamental frequency, e.g., by using the extracting filters 302 of FIG. 3. The second current component, that is, the remaining current component, can be obtained by subtracting the extracted current components (including the fundamental current component and the harmonic current components) from the measurement of the grid current. The controller can weigh all the current components with respective impedances to obtain respective component voltages. The impedances for the fundamental current component and the harmonic components can have smaller impedance amplitude than the impedance for the remanding current component. The controller can sum all the component voltages to obtain the shaped voltage, e.g., by using a summation operator 306 of FIG. 3.

The controller output a control signal causing the inverter to output the shaped voltage (612). For example, the controller can transmit the control signal to an internal controller of the inverter. The internal controller can output the shaped voltage based on the control signal to the power distribution bus of the power distribution system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for shaping a current output from an inverter coupled to a power distribution bus in a power distribution system, the method comprising:
   receiving a measurement of the current output from the inverter;
   processing the measurement of the current to extract a first current component having a particular frequency;
   obtaining a second current component based on the measurement of the current and the extracted first current component;
   weighing the first and second current components with respective first and second impedances to obtain respective first and second component voltages, the first impedance having a lower impedance amplitude than the second impedance;
   obtaining a shaped voltage based on the first and second component voltages; and
   outputting a control signal to the inverter, the control signal causing the inverter to output the shaped voltage to the power distribution bus.

2. The method of claim 1, wherein shaping a current further comprises obtaining a first modulation signal having the particular frequency, and
   wherein processing the measurement of the current to extract a first current component comprises extracting the first current component based on the measurement of the current and the first modulation signal.

3. The method of claim 2, wherein shaping a current further comprises obtaining a second modulation signal having the particular frequency,
   wherein processing the measurement of the current to extract a first current component comprises extracting the first current component based on the measurement of the current and the first and second modulation signals, and
   wherein the first modulation signal is a sine wave signal having the particular frequency and the second modulation signal is a cosine wave having the particular frequency.

4. The method of claim 1, wherein obtaining a second current component comprises subtracting the first current component from the measurement of the current.

5. The method of claim 1, further comprising determining the particular frequency to be one of a fundamental frequency of the power distribution system or a harmonic frequency of the fundamental frequency of the power distribution system, and
   wherein shaping a current further comprises:
      processing the measurement of the current to extract a third current component having a harmonic frequency of the fundamental frequency, the harmonic frequency being different from the particular frequency, wherein obtaining a second current component comprises subtracting the first and third current components from the measurement of the current;
      weighing the third current component with a third impedance to obtain a third component voltage, the third impedance having a smaller impedance amplitude than the second impedance; and
      obtaining the shaped voltage based on the first, second and third component voltages.

6. The method of claim 1, further comprising:
   receiving a voltage measurement of a load coupled to the power distribution bus; and
   determining the particular frequency based on the voltage measurement of the load.

7. The method of claim 1, further comprising determining the respective first and second impedances for the first and second current components.

8. The method of claim 7, wherein determining the respective first and second impedances for the first and second current components comprises:
   adjusting the first and second impedances for the first and second current components based on one or more performance parameters of the power distribution system.

9. The method of claim 1, wherein shaping a current comprises shaping the current by a linear filter.

10. The method of claim 1, further comprising:
    shaping a second current output from a second inverter coupled to the power distribution bus in the power distribution system, the second inverter outputting a second shaped voltage to the power distribution bus.

11. The method of claim 10, further comprising determining the respective first and second impedances for the first and second current components based on the second shaped voltage output from the second inverter.

12. A system comprising:
a plurality of distributed generation units each including:
- a respective DC power source;
- a respective inverter coupled to the respective DC power source; and
- a respective local controller coupled to the respective inverter and configured to perform operations comprising:
  - receiving a measurement of a current output from the respective inverter;
  - processing the measurement of the current to extract a first current component having a particular frequency;
  - obtaining a second current component based on the measurement of the current and the extracted first current component;
  - weighing the first and second current components with respective first and second impedances to obtain respective first and second component voltages, the first impedance having a lower impedance amplitude than the second impedance;
  - obtaining a shaped voltage based on the first and second component voltages; and
  - outputting a control signal to the respective inverter, the control signal causing the respective inverter to output the shaped voltage; and
a power distribution bus coupled to the plurality of distributed generation units and configured to transfer the shaped voltages from the distributed generation units to one or more loads coupled to the power distribution bus.

13. The system of claim 12, wherein the particular frequency is a fundamental frequency of the power distribution system, and wherein the operations further comprises:
- processing the measurement of the current to extract a plurality of current components having respective harmonic frequencies of the fundamental frequency, wherein obtaining a second current component comprises obtaining the second current component by subtracting the plurality of current components and the first current component from the measurement of the current; and
- weighing the plurality of current components with respective impedances to obtain respective component voltages, the respective impedances having impedance amplitudes smaller than the second impedance, wherein obtaining a shaped voltage comprises obtaining the shaped voltage based on the respective component voltages and the first and second component voltages.

14. The system of claim 12, wherein the operations further comprise determining the respective first and second impedances for the first and second current components.

15. The system of claim 14, wherein determining the respective first and second impedances for the first and second current components comprises:
adjusting the first and second impedances for the first and second current components based on one or more performance parameters of the system.

16. The system of claim 12, further comprising a main controller configured to communicate with the respective local controllers for the distributed generation units.

17. The system of claim 16, wherein the one or more loads include a nonlinear load, and wherein the main controller is configured to:
- receive a voltage measurement of the nonlinear load;
- process the received voltage measurement to determine one or more voltage components having one or more respective harmonic frequencies of a fundamental frequency of the power distribution system; and
- transmit information of the determined voltage components to the local controllers.

18. The system of claim 17, wherein, for each of the local converters, determining a particular frequency of the power distribution system comprises:
- receiving the transmitted information of the determined voltage components from the main controller; and
- determining the particular frequency to be the harmonic frequency of a voltage component having the largest voltage amplitude among the determined voltage components.

19. The system of claim 12, wherein the operations further comprise determining the respective first and second impedances for the first and second current components based on shaped voltages output from the other inverters of the plurality of distributed generation units in the power distribution system.

20. A non-transitory computer readable storage medium storing instructions executable by one or more processors and upon such execution cause the one or more processors to perform operations for shaping a current output from an inverter coupled to a power distribution bus in a power distribution system, the operations comprising:
- receiving a measurement of the current output from the inverter;
- processing the measurement of the current to extract a first current component having a particular frequency;
- obtaining a second current component based on the measurement of the current and the extracted first current component;
- weighing the first and second current components with respective first and second impedances to obtain respective first and second component voltages, the first impedance having a lower impedance amplitude than the second impedance;
- obtaining a shaped voltage based on the first and second component voltages; and
- outputting a control signal to the inverter, the control signal causing the inverter to output the shaped voltage to the power distribution bus.

* * * * *